Jan. 29, 1946.　　　C. DE GANAHL　　　2,393,892
REMOTE CONTROL SYSTEM
Filed June 6, 1940　　　6 Sheets-Sheet 1
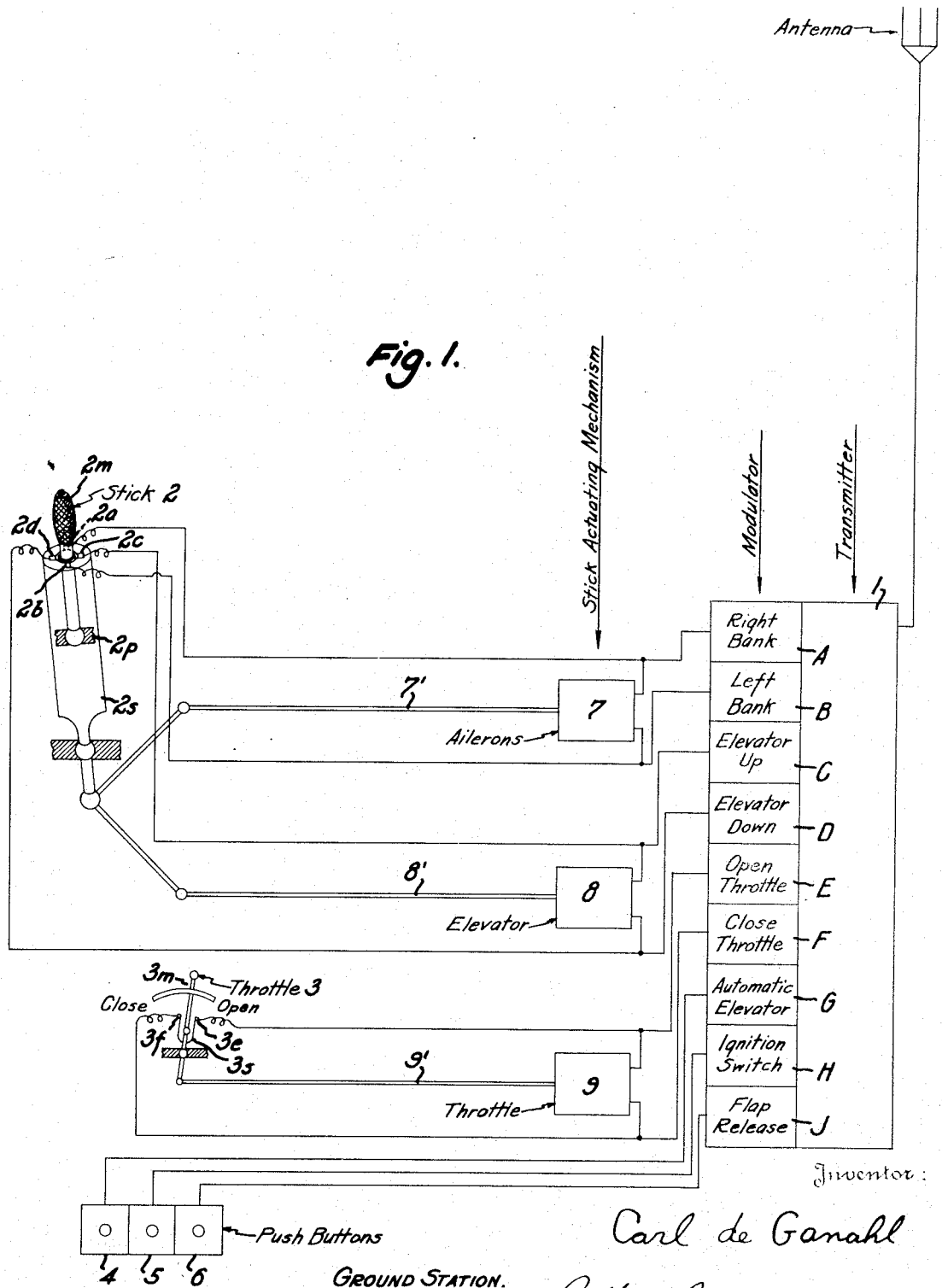

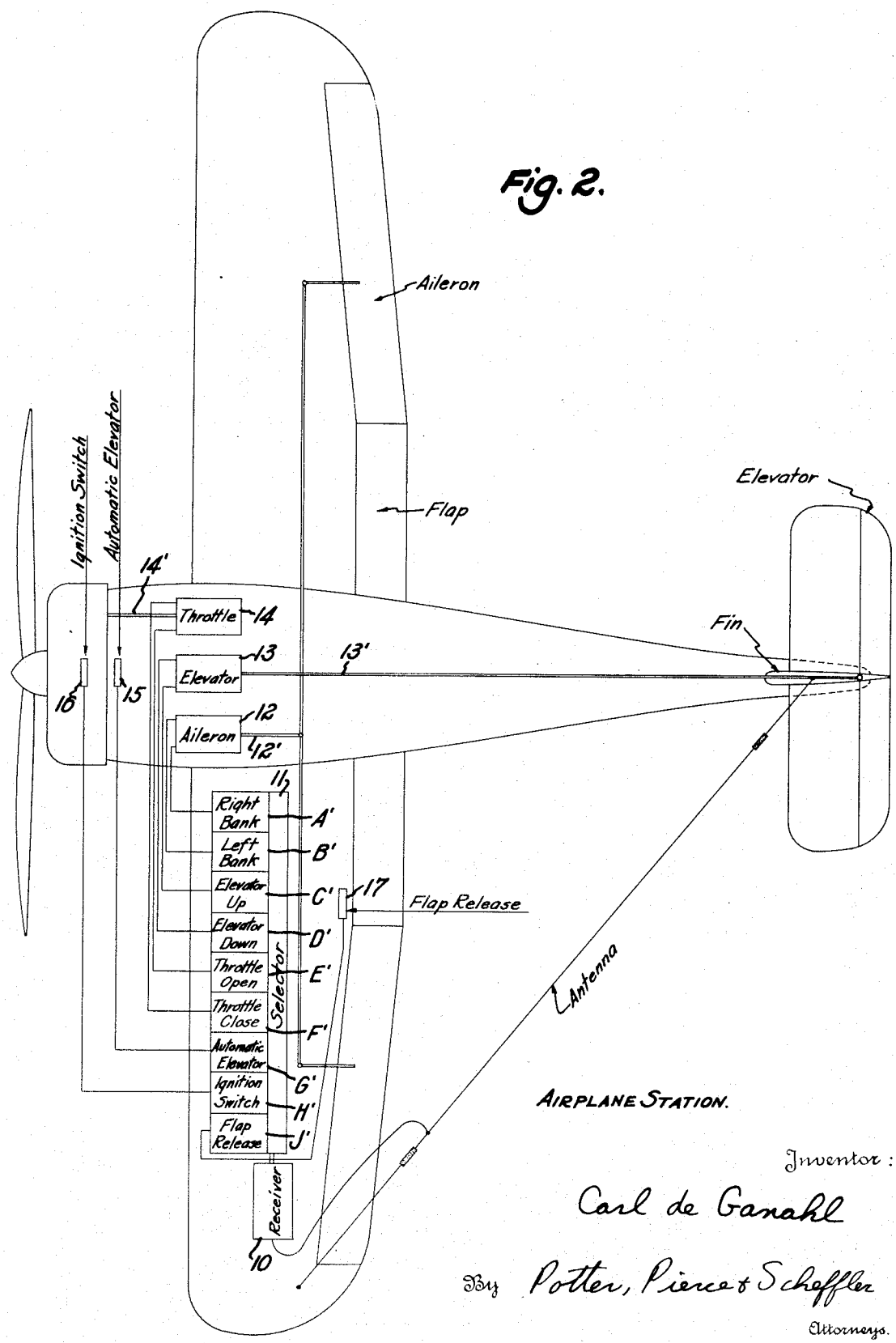

Jan. 29, 1946.　　　C. DE GANAHL　　　2,393,892
REMOTE CONTROL SYSTEM
Filed June 6, 1940　　　6 Sheets-Sheet 3
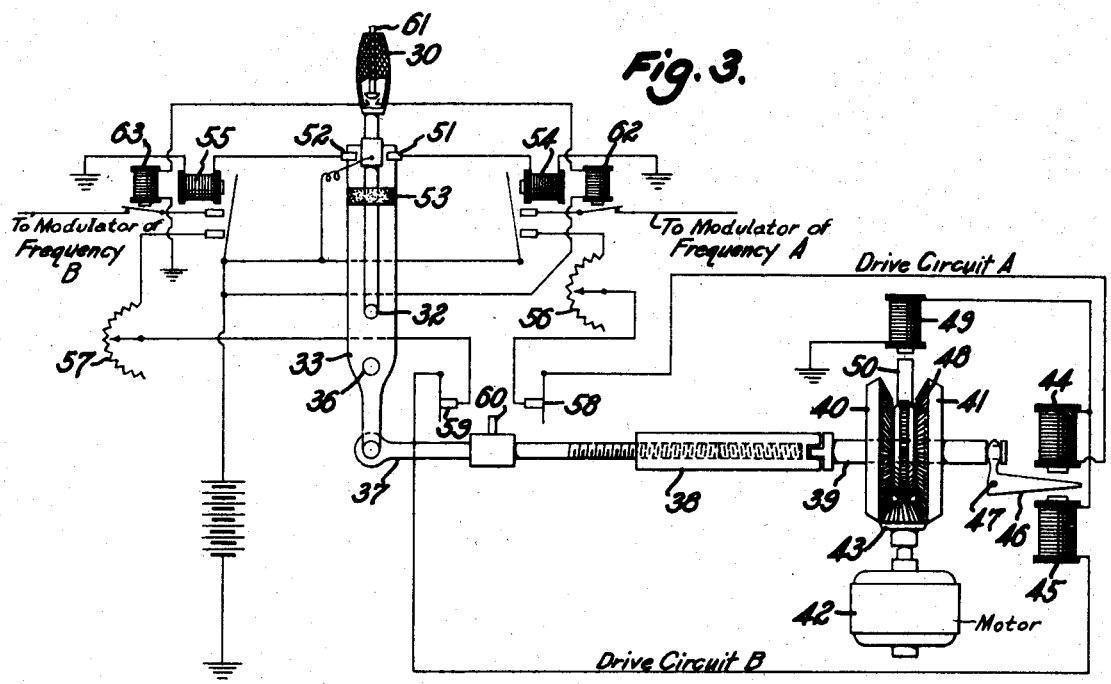
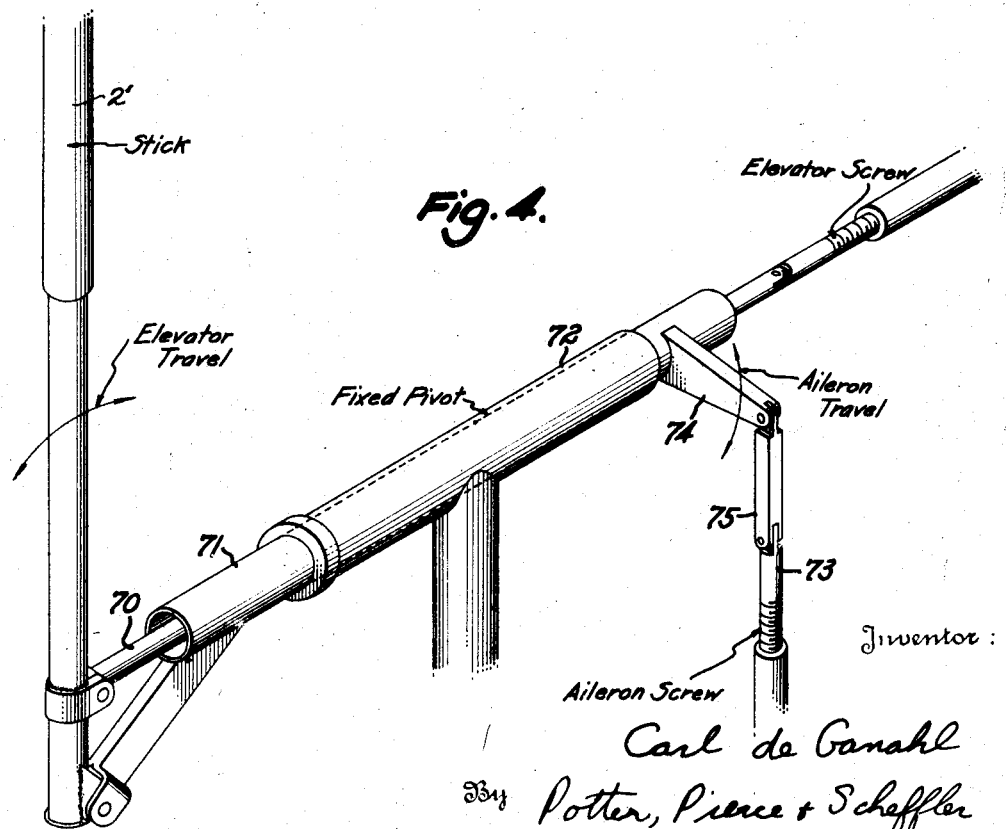
Inventor:
Carl de Ganahl
By Potter, Pierce & Scheffler
Attorneys.

Jan. 29, 1946.　　　C. DE GANAHL　　　2,393,892
REMOTE CONTROL SYSTEM
Filed June 6, 1940　　　　6 Sheets-Sheet 4
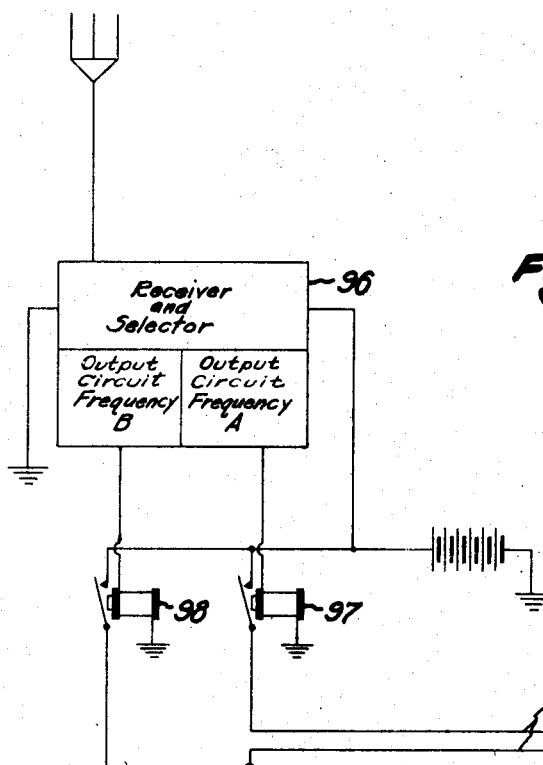
Fig. 5.
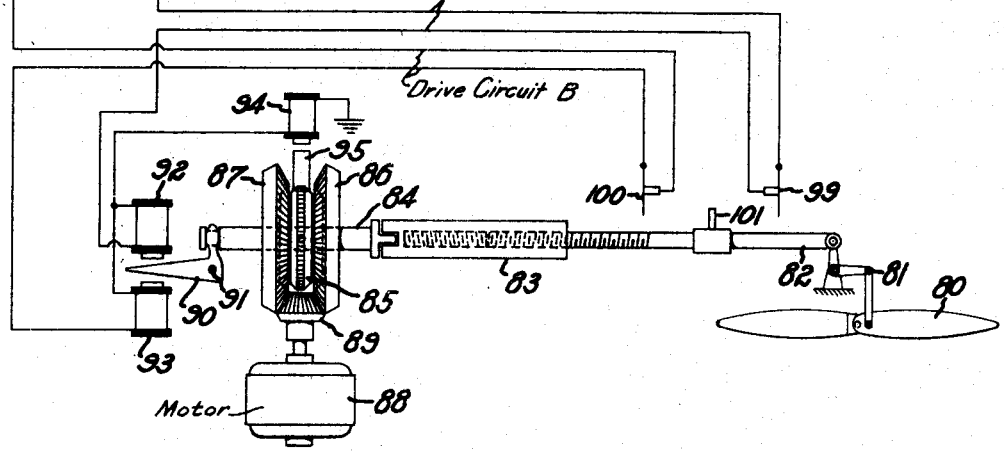
Fig. 6.
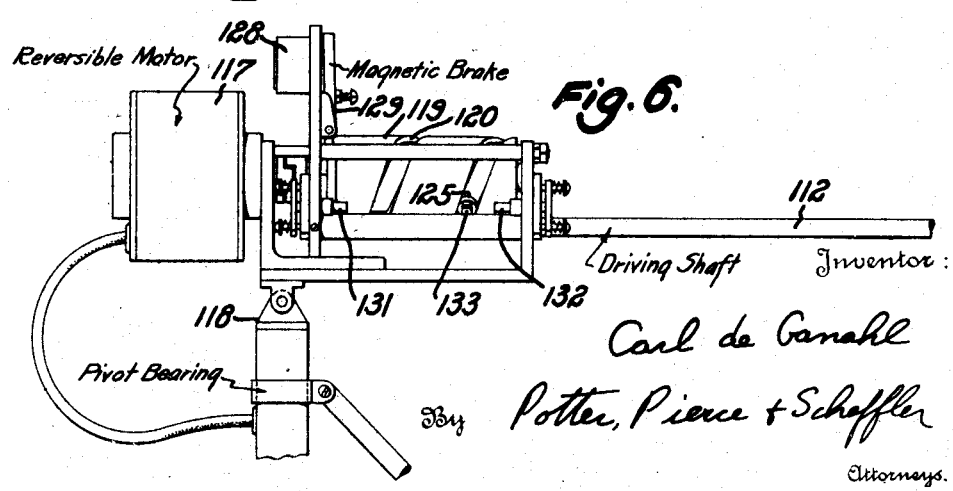
Inventor:
Carl de Ganahl
By Potter, Pierce & Scheffler
Attorneys.

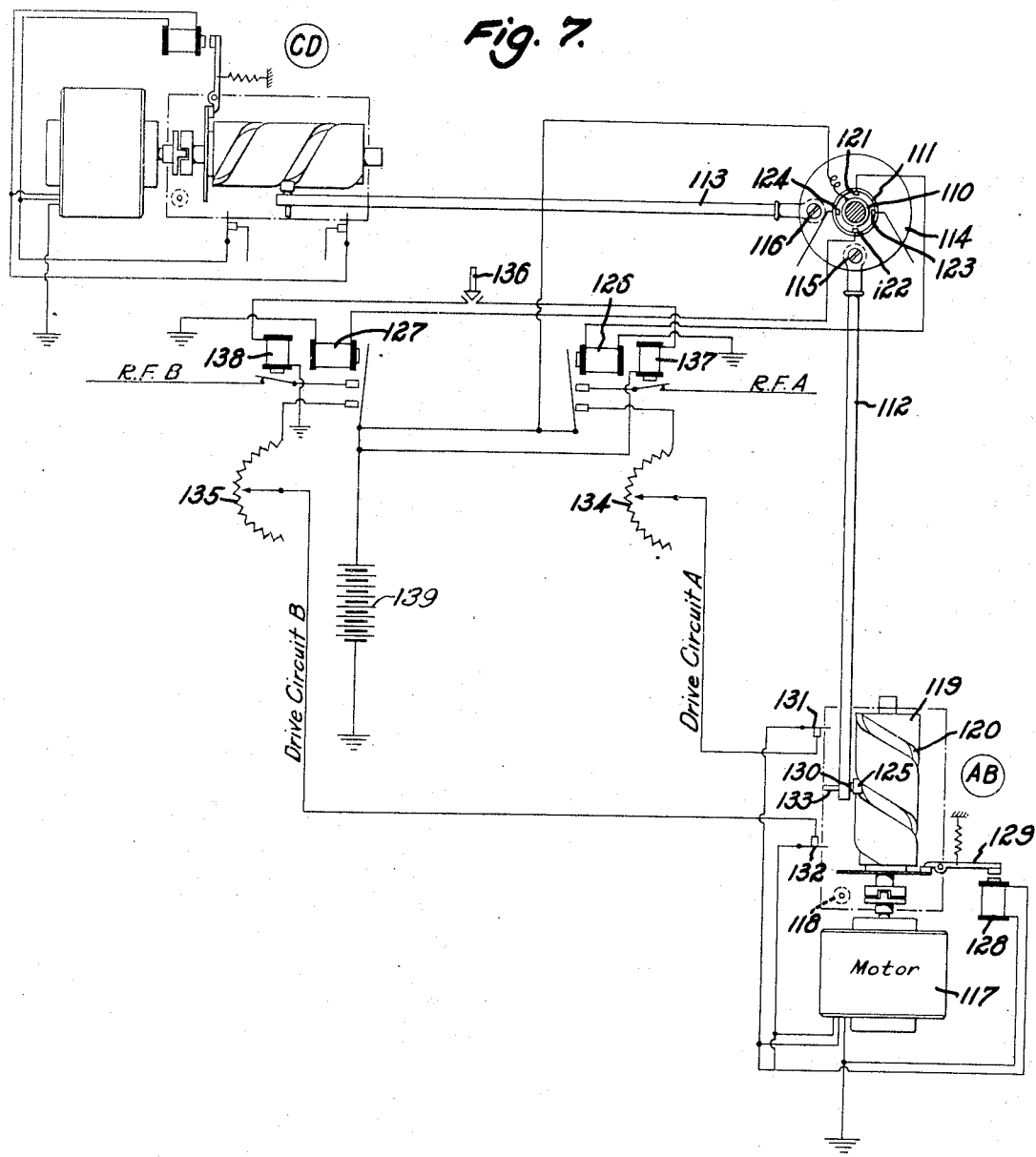

Jan. 29, 1946.  C. DE GANAHL  2,393,892
REMOTE CONTROL SYSTEM
Filed June 6, 1940  6 Sheets-Sheet 6
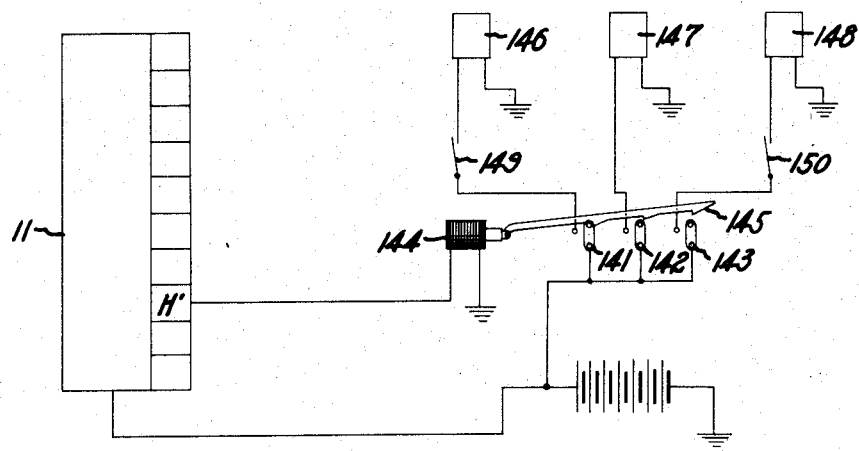
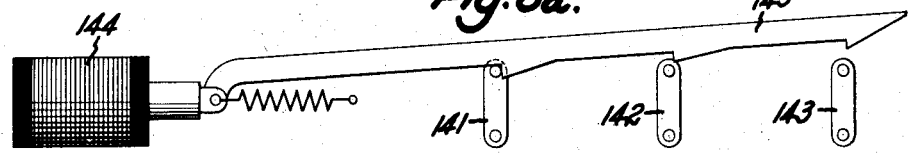
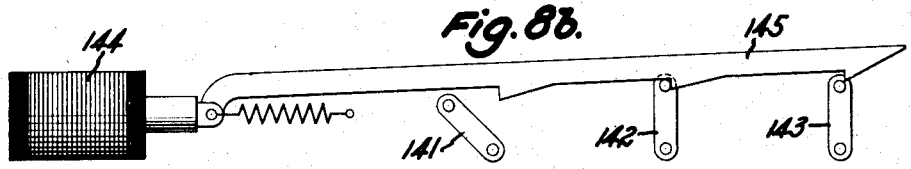
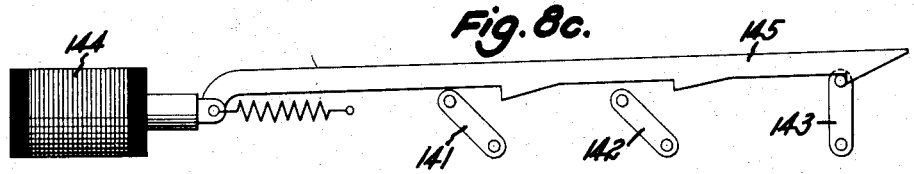
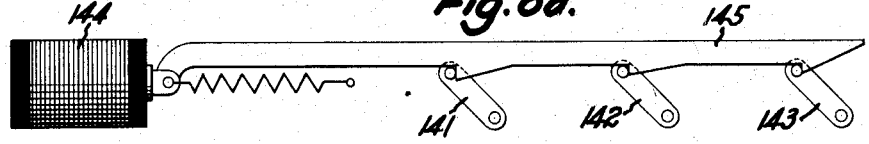
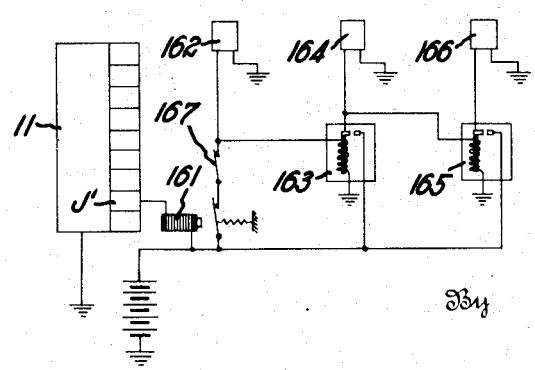
Inventor:
Carl de Ganahl
By Potter, Pierce & Scheffler
Attorneys.

Patented Jan. 29, 1946

2,393,892

UNITED STATES PATENT OFFICE 2,393,892

REMOTE CONTROL SYSTEM

Carl de Ganahl, Bristol, Pa., assignor, by mesne assignments, to Reconstruction Finance Corporation Application June 6, 1940, Serial No. 339,184

22 Claims. (Cl. 250—2)

This invention relates to a remote control system for moving bodies and particularly to a system whereby the speed and direction of a moving vehicle, as well as operable devices on such vehicle, may be controlled by means of radiant energy signals from a distant control station. The system may be utilized for the control of land, water and air vehicles of all types. It is particularly suited, however, for the remote control of aircraft, and will be more particularly described for the purpose of illustration as applied to the control of airplanes.

The objects and purposes of the invention include the provision of a remote control system whereby the operation of a course control device on a moving vehicle may be continuously controlled both as to rate of movement and extent of movement from a distant control station, the provision of a remote control system whereby the operation of a plurality of course control devices on a moving vehicle may be continuously, simultaneously and independently controlled both as to rate of movement and extent of movement from a distant control station, the provision of a remote control system wherein the control actuating devices at the control station are similar to, and manipulated in the same manner as, the usual control actuating devices normally used on the moving vehicle and wherein the course control devices on the moving vehicle respond to manipulation of the control actuating devices at the control station in the same manner as they would respond to manipulation of corresponding actuating devices on the vehicle. Other objects and advantages of the invention will be apparent from the following description.

In the operation of moving vehicles, certain control effecting members or devices, particularly those governing the direction and speed of the vehicle, which may be designated as course control devices, are manipulated not only in a selected sense and to a selected extent but also at a selected rate which, in general, may be continuously varied over a range extending from zero to the maximum possible rate of movement of the control member. For example, in an airplane, the resultant motion of the plane upon altering the angle of the elevator surfaces is dependent not only on the sense of the alteration and the ultimate extent of the alteration, but also upon the rate at which the alteration is effected. A rapid alteration to fully depressed position will result in a much different maneuver from a slow alteration to the same position. Moreover, to obtain desired effects the pilot may wish to operate the control member at a gradually increasing rate or at a gradually decreasing rate or at any of an infinite number of rate variation patterns. The same conditions apply to such other airplane control operations as throttle, aileron and rudder manipulation.

It is a serious defect of remote control devices and systems heretofore proposed that they permitted no effective control of the rate of operation of the control effectuating device. They have permitted selection of any of a plurality of elements to be moved, and, usually, determination of the extent of movement of the selected device, but they have not provided any continuously controllable variation in the rate of movement to correspond with the actual manipulation of vehicle controlled devices. This defect has resulted in a very substantial loss of flexibility of control in remote control operations and also involved the further serious disadvantage that the manipulation of the remote control was so different from that used in direct vehicle control that operators trained in vehicle control had to undergo an extensive period of training to adjust themselves to the different conditions of remote control.

A flexibility of remote control similar to that of direct vehicle control is provided in the system of the invention wherein, not merely does the manipulation of a control actuating member at the control station select the control effecting device to be moved and the direction of its movement, but also the rate of movement of the control effecting device on the vehicle corresponds to the rate of movement of the control actuating member, either directly or in a predetermined or a continuously adjustable ratio.

This desirable result is obtained by transmitting to the vehicle a radiant energy signal having a selectively detectable characteristic selected to bring about operation of a selected control member and having an integrated energy flux proportional to the rate of manipulation of the control actuating member at the control station. Advantageously, the signal is given a frequency selected to energize a tuned energy-responsive circuit on the vehicle which actuates the operation of constant speed driving mechanism connected to the selected course control device, while the signal is transmitted in impulses proportional in total duration per unit time to the rate of movement of the actuating member at the control station.

The remote control system of the invention also provides means whereby a plurality of vehicle control devices may be controlled by means of a single radiant energy-responsive circuit and means whereby automatic operation of a plurality of vehicle control devices in predetermined sequence may be initiated by means of a single radiant energy-responsive circuit.

Various illustrative aspects and modifications of the invention as applied to the remote control of an airplane will be described with reference to the accompanying drawings in which, Fig. 1 is a diagrammatic representation of a complete control station for remote control of an airplane in accordance with the principles of the invention;

Fig. 2 is a diagrammatic representation of a complete vehicle station corresponding to the control station of Fig. 1;

Fig. 3 is a diagrammatic representation of a portion of a control station showing the control station elements for controlling the transmitted signals corresponding to one vehicle control effecting device;

Fig. 4 is a fragmentary perspective view of the motion transmitting elements of a control member adapted for simultaneous control of two vehicle control effecting devices;

Fig. 5 is a diagrammatic representation of the portion of a vehicle station showing the vehicle station elements corresponding to the portion of the control station of Fig. 3;

Fig. 6 is a fragmentary elevation showing a modified control member driving mechanism embodying the principles of the invention;

Fig. 7 is a diagrammatic representation of a modified control stick assembly and circuit elements including the driving mechanism of Fig. 6;

Fig. 8 is a diagrammatic representation of vehicle elements for the remote control of a plurality of vehicle devices by sequential operation of a single radiant energy-responsive circuit;

Figs. 8a, 8b, 8c and 8d are fragmentary, diagrammatic representations of the sequential operation of the arrangement of Fig. 8; and Fig. 9 is a diagrammatic representation of an arrangement for the controlled automatic sequential operation of a plurality of vehicle devices.

The ground control station of Fig. 1 is represented, for the purpose of illustration, as providing for the complete ground station control of an airplane, including the following controllable elements: ailerons, elevator, engine throttle, engine switch, automatic elevator switch and wing-flap release. The first three elements involve rate of operation control which is a particular characteristic of the present invention and each also requires operation in two senses, as right, left, up or down, and the like. If a movable rudder were present on the airplane, the ground station could include an additional control actuating member, for example, a foot pedal, with associated mechanism similar to that to be described with reference to the first three elements enumerated above.

The other control elements enumerated do not involve control of rate of operation but are only on-off controls.

The station comprises a radiant energy transmitting device 1, associated with a series of modulating devices A to J, corresponding in number to the number of operations or operation sequences to be controlled on the airplane. The station further comprises a plurality of control actuating members of two classes. As shown in Fig. 1, these comprise, in the first class, a "joy stick" 2, actuating control of aileron and elevator, and a throttle 3 actuating control of the engine throttle, and in the second class, push buttons 4, 5, 6 actuating control of the automatic elevator, ignition switch and flap release, respectively. Each control actuating member of the second class, in particular, may be utilized to actuate control of a plurality of operations or devices on the vehicle, as will be described hereinafter.

The control actuating members of the first class typically comprise a manual element and a driven element connected together for limited relative motion and two or more contact elements actuated by relative motion of the manual and driven elements. Associated with the control actuating members of the first class are driving devices 7, 8, 9 and corresponding connections 7', 8' and 9' to the control actuating devices. The energization of the driving devices and the energization of the corresponding modulating devices are jointly and simultaneously controlled by the control actuating members. For example, initiation of motion of throttle handle (manual element) 3m in the sense of opening the throttle, closes contact element 3e, for example a switch or valve, which controls, for example, electrically, hydraulically, or mechanically, the energization of driving device 9 so as to drive throttle support (driven element) 3s, which carries the contact elements 3e and 3f, in a direction to normally reopen the actuating element 3e and at the same time controls the energization of modulator device E. It will be evident that while contact element 3e is maintained in closed position by suitable manipulation of throttle 3m, driving device 9 will continue to move the throttle support in a sense tending to open the contact element and the transmitter will continue to send a signal modulated by modulating device E.

However, both the operation of the driving device and the energization of the modulating device will be continuous only if the control station or pilot manipulates the throttle to permit it to move as fast as the driving device can move the throttle support. If the operator manipulates the throttle at any slower speed, the driving mechanism will cause contact element 3e to open and thereby de-energize the driving mechanism and the modulating device until the operator control motion of the throttle again closes element 3e. It will thus be seen that the driving element will cause the throttle support to follow the motion of the throttle, that the throttle support motion will be intermittent at all rates of motion of the throttle less than that equivalent to continuous operation of the driving mechanism, that the energization of modulating device E will be correspondingly intermittent and, finally, that the rate of transmission of the correspondingly modulated signal will be proportional to the rate of motion of throttle 3 as guided by the operator.

The operation of the system on reversing the direction of motion of throttle handle 3m so as to close contact element 3f which is connected to energize modulator device F and to energize the driving device in the reverse direction, will be readily apparent.

The driving device 9 may consist, for example, of a pair of motors, or a single motor, or of suitable connections to any source of power, for example, a common motor adapted to be put into driving connection with any selected driven member. In either case, the motors may be continuous in operation, in which case a connection in the proper sense to drive the throttle support in the desired direction is brought about by closure of a contact element, or the motors may operate only when energized by closure of a contact element, a single motor being, of course, reversible in the latter case. The operative connection 9' between the driving device 9 and the throttle support my be effected in any suitable manner, for example, mechanically or hydraulically. The phrase, "energization of the driving device" as used herein will be seen to include bringing a power device into operative actuating relation with the driven element of the control actuating member either by starting the power device or by bringing about an operative connection between a continuously running power device and the driven element of the control actuating member.

In order that operation of the control station may more nearly compare with actual airplane operation, the aileron and elevator movements, comprising right and left bank, and elevator up and down, are controlled by a single control actuating member 2 corresponding to the uusual airplane control stick. For this purpose the stick handle 2m may be given limited movement with respect to stick support 2s, in any direction about pivot point 2p, and such relative motion may actuate any one or any adjacent pair of contact elements 2a, 2b, 2c, 2d. Contact elements 2a and 2b energize driving device 7 in a sense effective to drive stick support 2s in a direction to open the currently closed contact element, and simultaneously they energize the modulating devices A and B, respectively. Similarly, contact elements 2c and 2d energize driving device 8 and modulating devices C and D.

As in the case of the throttle control, the connections between the contact elements and the modulating devices, between the contact elements and the driving devices, and between the driving devices and the driven elements, are shown merely diagrammatically in Fig. 1 and these connections may be mechanical, electrical, hydraulic or any suitable combination of these or other types of connecting means.

It will be seen that suitable movement of stick handle 2m can actuate any one contact element or any adjacent pair of contact elements, so that either ailerons or elevator may be operated or both may be operated simultaneously. It will further be seen that in the arrangement shown, provision is made for modulation of radiant energy transmitted from the antenna by transmitter 1, in nine different senses corresponding to the nine operations to be controlled in this particular arrangement. In this arrangement six of the modulating devices might be in operation simultaneously. However, since the three push button controls do not require a sustained signal, but merely a limited duration impulse, it is not necessary to operate more than one push button simultaneously, therefore, it is not necessary that more than four of the modulators be in operation together, thereby simplifying transmission and reception of the modulated signals. As will be more fully disclosed hereinafter, various modifications of the control system may be utilized to increase substantially the number of operations of the second class, that is, of the on-off type, which may be controlled with a single signal modulating device.

While the control station of Fig. 1 has been designated as a "ground" station, it need not be either fixed or on the ground but may be mounted on any suitable vehicle other than the controlled vehicle, for example, on a truck, boat or airplane.

The complete vehicle station diagrammatically represented in Fig. 2 corresponds to the control station of Fig. 1. The vehicle station comprises a radiant energy-sensitive receiver 10, adjusted to receive the signals transmitted by the control station, a plurality of energizing devices A' to J' corresponding to modulating devices A to J of the control station, and a selector 11 adapted to selectively transmit to the proper energizing device the signal as modulated by the corresponding modulating device of the ground station.

The vehicle station further comprises a plurality of driving devices of two classes. As shown in Fig. 2, the driving devices of the first class include aileron and elevator actuating motor devices 12 and 13, respectively, and corresponding connecting means 12' and 13' which are under the eventual control of stick 2 of Fig. 1, and throttle actuating motor device 14 and corresponding connecting means 14' under the eventual control of throttle lever 3 of Fig. 1.

The driving devices of the second class comprise on-off actuating devices 15 for the automatic elevator, 16 for the motor ignition switch and 17 for the wing-flap release.

The driving devices 12, 13 and 14 of the first class may consist, for example, of a pair of motors or a single motor, or of suitable connecting means to any power source such as a common motor, and "energization of the driving devices" by the energizing devices may include bringing a power device into operative actuating relation with a course control device either by starting a power device or by bringing about an operative connection between a continuously running power device and the course control device. As in the control station, the means connecting the power device with the course control device may include electrical, mechanical or hydraulic means.

Preferably the power device which actuates a course control device on the vehicle is synchronized in speed of operation, either one to one or at any suitable ratio, with the speed of operation of the power device which drives the corresponding control actuating device at the control station. Since the energization of any modulating device of the control station corresponds to the movement of the corresponding control actuating device, it will be seen that the corresponding course control device on the vehicle will move at a rate proportional to the rate of movement of the control actuating device at the control station, the ratio of the rates of movement being determinable by the operator by suitable adjustment of the speed of operation of the driving devices at the control station.

The signal modulating, transmitting, receiving and selecting devices per se do not form any part of the present invention, and any suitable radiant energy modulating, transmitting, receiving and selecting means, such as the system described in U. S. Patent 1,597,416 to Mirick, may be used.

In the portion of a control station shown in Fig. 3, only those elements entering into the control of a single vehicle course control device, for example, the ailerons of an airplane, are shown.

The control actuating device comprises a manual member or handle 30 which is pivoted at universal joint 32 inside a tube or main stick 33 which forms the driven member of the device. Tube 33 is pivoted at 36 and may be oscillated about pivot 36 by reciprocating motion of rod 37, imparted by rotation of shaft 38 in threaded engagement with the end of rod 37. Shaft 38 is coupled to shaft 39. Bevel gears 40, 41, which run freely on shaft 39, are driven by motor 42 through pinion 43. Energization of magnet 44 or 45 pulls clapper 46, which is pivoted at 47, so as to move clutch member 48, fixed to shaft 39, to right or left, into engagement with bevel gear 40 or 41, thus determining the direction of rotation of shaft 39 and the direction of motion of rod 37. Solenoid 49, which is in series with both magnets 44 and 45, when energized releases brake member 50 which normally prevents rotation of clutch member 48 and shaft 39. Mounted on tube 33 are electrical contacts 51, 52 adapted to be actuated separately and selectively by contact with handle 30. 53 is a ring of rubber or other device for normally urging handle 30 into a central position and thereby keeping contacts 51, 52 normally open. The resilience of device 53 is such that convenient hand pressure on handle 30 will close either contact 51 or 52 thereby closing relay 54 or 55, respectively, and energizing the circuit controlling radio frequency A or B, and also energizing magnet 44 or 45, respectively, and solenoid 49.

Thus, when handle 30 is pushed to the left, contact 52 is closed which energizes radio frequency circuit B in the associated transmitting set and at the same time causes tube 33 to be moved to the left by the driving mechanism. The movement of handle 30 may be stopped at any point whereupon movement of tube 33 will continue just long enough to break contact 52 thus de-energizing both radio frequency circuit B and the corresponding drive circuit B. The driving mechanism may be designed and adjusted so that the rate of movement of tube 33 is as great as the most rapid desired movement of handle 30. Movement of handle 30 may be as slow or as fast as desired, within the full manual control of the operator up to the maximum speed of tube 33. When handle 30 is moved at a rate less than the maximum speed of tube 33, the tube will follow the handle in a series of intermittent jumps corresponding to the periods during which contacts 51 and 52 are closed. Likewise, radio frequencies A and B will be transmitted during corresponding periods.

Drive circuits A and B of Fig. 3 include variable rheostats 56, 57 and limit switches 58, 59, the latter being operated by finger 60 on rod 37. The limit switches serve as safety devices to insure against the driving mechanism overrunning the mechanical limits of operation. The rheostats 56 and 57 serve to vary the voltage impressed on magnets 44, 45 and thus vary the speed of their response to the closing of contacts 51, 52. By this means the speed of response at the control station may be slowed up relative to the speed of response in the airplane to compensate for delays in the transmitter and receiver relays which tend to make the airplane control response slower than the response of the ground station driving mechanism. In this way operation of the airplane control devices can be kept synchronized during flight with the operation of the actuating devices of the control station.

By means of push button 61 in handle 30, the radio frequency circuits A and B may be opened by energization of relays 62, 63. This permits the drive circuits to be operated without correspondingly energizing the radio frequency circuits and thus permits the operator to bring the position of the control handle 30 into correspondence with the position or attitude of the airplane at any time.

In order to provide for control of both ailerons and elevators by means of the control stick assembly of Fig. 3, a further pair of contacts are provided between handle 30 and tube 33 at points half-way between contacts 51 and 52, as indicated diagrammatically in Fig. 1. The additional pair of contacts are then connected to paired radio frequency circuits and drive circuits duplicating the features of radio circuits A and B and drive circuits A and B of Fig. 3.

Conversion of the universal movement of the stick into two sets of rectilinear movements may be effected as shown in the fragmentary view of Fig. 4. In this arrangement the resultant in one direction of movements of the stick 2' causes reciprocal motion of rod 70 within tube 71 while the resultant in the direction normal thereto causes rotation of tube 71 within fixed bearing tube 72, which is translated into reciprocal motion of rod 73, by lever 74 and link 75.

Instead of pivoting the lower end of the manual element or handle in a universal joint as indicated in Fig. 3, the lower end of the handle member may advantageously be rigidly fixed in a socket in the tube or driven member of the stick, movement of the handle being effected by an amount of hand pressure determined by the stiffness of the lower portion of the handle member.

For the contact devices operated by movement of the handle within the stick tube, electric switches may advantageously be used. It has been found particularly desirable to use a switch of the type which only closes under a pressure appreciably higher than the pressure at which it opens, for example, a switch of the type shown in U. S. Patent 1,960,020 to McGall. By the use of a switch of this type, closing of the circuits is made definite and sharp as no electrical contact is made until the pressure on the contact device reaches a definite minimum and as soon as the minimum pressure is reached the electrical contact is effected under a pressure which is uniform until pressure on the device drops below a point which is appreciably lower than the minimum pressure required for actuation. By this means energization of the radio frequency circuit is definite and clear-cut and a sharply defined signal having a constant minimum duration is produced at each closing of the contact. This insures that the operating circuits and mechanism in the vehicle station of the system will positively operate at each closing of the contacts on the control stick.

Fig. 5 shows the portion of the vehicle station corresponding to the portion of the control station illustrated in Fig. 3 and shown, by way of example, as applied to manipulation of the ailerons.

Aileron 80 is moved up and down through linkage 81 actuated by reciprocating motion of rod 82 which is in threaded engagement with shaft 83. Shaft 83 is coupled to shaft 84 which carries clutch member 85 fixed thereto but slidable longitudinally thereon. Bevel gears 86, 87 which run freely on shaft 84 are driven by motor 88 through pinion 89. Clutch member 85 is shifted by means of clapper 90, pivoted at 91, which is under the control of magnets 92, 93. Solenoid 94, connected in series with both magnets 92 and 93, when energized releases brake member 95 which normally prevents rotation of clutch member 85 and shaft 84.

When a signal from the control station, modulated at frequency A or B of Fig. 3, is picked up by receiver and selector, it is passed on to the corresponding relay 97 or 98 whereby drive circuits A and B are energized, energizing the corresponding magnet 92 or 93, together with brake release solenoid 94, and bringing about the desired motion of aileron 80 at a rate and to an extent determined by the rate and extent of motion of stick 30 effected by the operator at the control station of Fig. 3. Drive circuits A and B include limit switches 99, 100, operated by finger 101 on rod 82 to prevent overrunning the mechanical limits of the apparatus.

Instead of the electromechanical relays, shown by way of example in Figs. 3 and 5, other relay devices, such as electronic relays, may be used.

Figs. 6 and 7 illustrate another form of driving mechanism utilizing a reversible motor in place of the reversible clutch mechanism of Figs. 3 and 5.

In Fig. 7, 110 is the manual element or handle of the control stick and 111 is the driven element or tube. Contact devices 121, 122, 123 and 124 are operated by relative motion of handle 110 toward tube 111. Rods 112, 113 pivoted to collar 114 by universal joints 115, 116 are operatively connected to the driving mechanism, which is shown in elevation in Fig. 6.

Driving mechanism AB of Fig. 7, which will be more particularly described with its associated circuits, corresponds to the driving mechanism shown in Fig. 3 and may be assumed to correspond to modulating devices tuned to the aileron circuits of the airplane. Driving mechanism CD is similar to mechanism AB and may be assumed to correspond similarly with the elevator control circuits.

Motor element 117 of the driving mechanism is a low speed, reversible, alternating current, synchronous motor, mounted on universal joint 118. Motor 117 drives worm 119, the groove 120 of which is in engagement with roller 125 carried on pin 130 in the end of drive rod 112. Closure of contacts 121, for example, energizes relay 126, which in turn energizes both radio frequency circuit A and drive circuit A from current source 139. Relay 127, connected to contact 122, likewise energizes radio frequency circuit B and drive circuit B. Energization of drive circuits A and B starts motor 117 in the direction of rotation which will tend to open the closed contact device at the stick and simultaneously energizes magnet 128 to release brake 129. Limit switches 131, 132 are actuated by pin 133. Rheostats 134, 135 in drive circuits A and B, respectively, enable the operator to synchronize the speed of response of the motor to the speed of operation of the corresponding course control element in the airplane. By means of push button 136, the operator can disconnect radio frequency circuits A and B by energizing magnets 137, 138, and thereby adjust the position of the control stick without energizing the radio frequency circuits.

Contacts 123, 124 may be similarly connected to drive circuits to energize drive mechanism CD and to radio frequency circuits tuned to control the elevator operation circuits on the airplane.

Referring now again to Figs. 1 and 2 and, particularly to the push button circuits controlled by push buttons 4, 5, 6, it has already been pointed out that various arrangements and devices may be provided to increase the number of operations on the airplane which may be controlled by a single push button circuit.

The airplane station circuit G' controlled by push button 4 may advantageously be arranged so that alternate impulses in this circuit switch the operation from manual ground-controlled operation to automatic operation under control of an automatic pilot device in the airplane and from automatic back to manual control.

Ignition switch circuit H' may be arranged for sequence operation so that the first impulse effected by push button 5 causes the engine ignition to be turned off, while the second impulse actuates mechanism causing the release of a parachute connected to the plane in order to facilitate salvage of the plane in case of possible failure of the control system.

The flap release circuit J' energized by push button circuit 6 actuates spring-operated wing-flap release mechanism, whereby the wing-flap may be lowered before landing the airplane.

Further advantageous modifications of these controls are illustrated in Figs. 8 and 9.

Figs. 8 and 8a—d illustrate a sequence operated control system which may be actuated, for example, by energization of circuits H and H' of Figs. 1 and 2, respectively, which are controlled by push button 5.

When a flight is started, switches 141, 142 and 143 are set in "off" position, as shown in Fig. 8a. When push button 5 is operated the energization of airplane station circuit H' by the selector 11 closes the circuit to solenoid 144 which pulls ratchet 145 to the left and closes switch 141, as shown in Fig. 8b, which energizes solenoid 146 (Fig. 8), operating the flap release mechanism.

The second time push button 5 is closed ratchet 145 engages and closes switch 142, as shown in Fig. 8c, energizing solenoid 147 which cuts the engine ignition switch.

Upon pushing button 5 the third time, ratchet 145 engages and closes switch 143, as shown in Fig. 8d, energizing solenoid 148 which releases the parachute.

Switches 149 and 150 are included in the circuits to solenoids 146 and 148, respectively, so that these circuits may be opened automatically while the plane is on the ground. This permits cutting the ignition switch during a ground run without releasing the flaps or inadvertently releasing the parachute.

In the arrangement of Fig. 9, which may be inserted in airplane station circuit J', for example, provision is made for actuation of safety and salvage operations and devices upon failure of a standby signal. In this arrangement one signal is continuously transmitted at a frequency which causes selector 11 to energize circuit J', which holds relay 161 in normally open position. Then failure of the signal in the transmitter or receiver would permit this relay to close, energizing the circuit to solenoid 162, which actuates a smoke signal device, and to time delay relay 163, which is adjusted to close approximately 60 seconds after energization.

Closing of time delay relay 163 energizes the circuit to solenoid 164, which cuts off the ignition switch, and to time delay relay 165 which is set to close approximately 10 seconds after it is energized. Closure of relay 165 energizes solenoid 166 which actuates the parachute release device. Switch 167, in the circuit to solenoid 162, is arranged to open automatically when the airplane is on the ground and close when the airplane leaves the ground, which permits the transmitter to be shut down whenever the plane is on the ground without actuating the smoke signal or ignition switch or releasing the parachute.

Re-energization of circuit J at any time before the sequence of operations is completed would open relay 161 and interrupt the sequence of operations. Thus, if the operator at the control station loses sight of the controlled vehicle, he can, by stopping the transmission of the signal to circuit J', bring about the emission of a smoke signal. If within 60 seconds the vehicle is sighted, the signal may be transmitted again whereupon the sequence of operations is interrupted and manual control from the control station may be resumed. If the signal is not resumed within 60 seconds, the sequence of operations continues by cutting out the engine and releasing the salvage parachute.

I claim:

1. In a remote control system for moving vehicles, selective control actuating means comprising a manually movable member, a driven member, power means in driving connection with said driven member, radiant energy transmitting circuits, and means actuated by movement of the manually movable member to energize said power means and said circuits and actuated by movement of the driven member to de-energize said power means and said circuits.

2. In a remote control system for moving vehicles, selective control actuating means comprising a manually movable member, a driven member, power means in driving connection with said driven member, a radiant energy transmitter, means for modulating said transmitter at a plurality of different frequencies, means selectively actuated by movement of the manually movable member to energize said power means and to energize said means for modulating said transmitter at a frequency determined by the direction of motion of the manually movable member and actuated by movement of the driven member to de-energize said power means and said modulating means.

3. In a remote control system for moving vehicles, selective control actuating means comprising a manually movable member, a driven member, power means in driving connection with said driven member, a radiant energy transmitter, means for modulating said transmitter at a plurality of different frequencies, means selectively actuated by movement of the manually movable member to energize said power means to drive said driven member in the direction of motion of the manually movable member and to energize means for modulating said transmitter at a frequency determined by the direction of motion of the manually movable member and actuated by movement of the driven member to de-energize said power means and said modulating means.

4. In a remote control system for moving vehicles, selective control actuating means comprising a manually movable member, a driven member, means normally urging said members into spaced relation, power means in driving connection with said driven member, a radiant energy transmitter, means for modulating said transmitter at a plurality of different frequencies, means selectively actuated by movement of said manually movable member to energize said power means to drive said driven member in a direction to restore said normal spaced relation and to energize said means for modulating said transmitter at a frequency determined by the direction of motion of the manually movable member, and means actuated by movement of the driven member to de-energize said power means and said modulating means.

5. In a remote control system for moving vehicles, selective control actuating means comprising a manually movable member, a driven member, means normally urging said members into spaced relation, power means in driving connection with said driven member, a radiant energy transmitter, means for modulating said transmitter at a plurality of different frequencies, electric circuit elements selectively actuated by movement of said manually movable member to energize said power means to drive said driven member in a direction to restore said normal spaced relation and to energize means for modulating said transmitter at a frequency determined by the direction of motion of the manually movable member and electric circuit elements actuated by movement of the driven member to de-energize said power means and said modulating means.

6. In a remote control system for moving vehicles, selective control actuating means comprising a manually movable member, a driven member, resilient means normally urging said members into spaced relation, power means in driving connection with said driven member, a radiant energy transmitter, means for modulating said transmitter at a plurality of different frequencies, means selectively actuated by movement of said manually movable member to energize said power means to drive said driven member in a direction to restore said normal spaced relation and to energize means for modulating said transmitter at a frequency determined by the direction of motion of the manually movable member, and means actuated by movement of the driven member to de-energize said power means and said modulating means.

7. In a remote control system for moving vehicles, selective control actuating means comprising a manually movable member, a driven member, means normally urging said members into spaced relation, power means in driving connection with said driven member, a radiant energy transmitter, means for modulating said transmitter at a plurality of different frequencies, electric circuit elements including energy-controlling devices selectively actuated by movement of said manually movable member to energize said power means to drive said driven member in a direction to restore said normal spaced relation and to energize means for modulating said transmitter at a frequency determined by the direction of movement of said manually movable member and actuated by movement of the driven member to de-energize said power means and said modulating means.

8. In a remote control system for moving vehicles, selective control actuating means comprising a manually movable member, a driven member, means normally urging said members into spaced relation, power means in driving connection with said driven member, a radiant energy transmitter, means for modulating said transmitter at a plurality of different frequencies, electric circuit elements including energy-controlling devices selectively closed by movement of said manually movable member to energize said power means to drive said driven member in a direction to restore said normal spaced relation and to energize means for modulating said transmitter at a frequency determined by the direction of movement of said manually movable member and opened by movement of the driven member to de-energize said power means and said modulating means.

9. In a remote control system for moving vehicles, selective control actuating means comprising a manually movable member, a driven member, means normally urging said members into spaced relation, power means in driving connection with said driven member, a radiant energy transmitter, means for modulating said transmitter at a plurality of different frequencies, electric circuit elements including energy-controlling devices selectively closed by movement of said manually movable member to energize said power means to drive said driven member in a direction to restore said normal spaced relation and to energize means for modulating said transmitter at a frequency determined by the direction of movement of said manually movable member and opened by movement of the driven member to de-energize said power means and said modulating means, said energy controlling devices closing only at a pressure substantially higher than the pressure at which they open.

10. In a remote control system for moving vehicles, selective control actuating means comprising a member manually movable in opposite directions, a driven member, power means connected to said driven member to drive said member in either of said directions, a radiant energy transmitter, means for modulating said transmitter at at least two different frequencies, means selectively actuated by movement of said manually movable member to energize said power means to drive said driven member in the direction of movement of the manually movable member and to energize means for modulating said transmitter at one of said frequencies in response to movement of the manually movable member in one direction and at another of said frequencies in response to movement of the manually movable member in the opposite direction, and means actuated by movement of said driven member to de-energize said power means and said modulating means.

11. In a remote control system for moving vehicles, selective control actuating means comprising a driven member, a manual member movably carried by said driven member in normally spaced relation therefrom, power means in driving connection with said driven member, energy-controlling means carried by at least one of said members, said energy-controlling means being inoperative in said normal spaced relation and being actuated by movement of said manual member to energize said power means to drive said driven member in a direction to restore said normal spaced relation and to energize signal transmitting means selected in response to the direction of motion of said manual member.

12. In a remote control system for moving vehicles, selective control actuating means comprising a driven member, a manual member movably carried by said driven member in normally spaced relation therefrom, power means in driving connection with said driven member, a plurality of energy-controlling devices carried by at least one of said members, said energy-controlling devices being inoperative in said normal spaced relation and being selectively actuated by movement of said manual member to energize said power means to drive said driven member in a direction to restore said normal spaced relation and to energize signal transmitting means selected in response to the direction of motion of said manual member.

13. In a remote control system for moving vehicles, selective control actuating means comprising a manually movable member, a driven member, means normally urging said members into spaced relation, power means in driving connection with said driven member, a radiant energy transmitter, means for modulating said transmitter at a plurality of different frequencies, electric circuit elements including energy-controlling devices selectively closed by movement of said manually movable member to energize said power means to drive said driven member in a direction to restore said normal spaced relation and to energize means for modulating said transmitter at a frequency determined by the direction of movement of said manually movable member and opened by movement of the driven member to de-energize said power means and said modulating means, and means for selectively disconnecting circuit elements normally energizing said modulating means without affecting energization of said power means.

14. In a remote control system for moving vehicles, selective control actuating means comprising a manually movable member, a driven member, means normally urging said members into spaced relation, power means in driving connection with said driven member, a radiant energy transmitter, means for modulating said transmitter at a plurality of different frequencies, electric circuit elements including energy-controlling devices selectively closed by movement of said manually movable member to energize said power means to drive said driven member in a direction to restore said normal spaced relation and to energize means for modulating said transmitter at a frequency determined by the direction of movement of said manually movable member and opened by movement of the driven member to de-energize said power means and said modulating means, said circuit elements including means for selectively modifying the speed of response of said power means to movement of said manually movable member.

15. In a remote control system for moving vehicles, selective control actuating means comprising a manually movable member, a driven member, means normally urging said members into spaced relation, power means in driving connection with said driven member, a radiant energy transmitter, means for modulating said transmitter at a plurality of different frequencies, electric circuit elements including energy-controlling devices selectively closed by movement of said manually movable member to energize said power means to drive said driven member in a direction to restore said normal spaced relation and to energize means for modulating said transmitter at a frequency determined by the direction of movement of said manually movable member and opened by movement of the driven member to de-energize said power means and said modulating means, said circuit elements including energy-controlling devices for selectively modifying the speed of response of said power means to movement of said manually movable member.

16. In a remote control system for moving vehicles, a receiving system including a tuned circuit responsive to radiant energy signals of predetermined frequency, a plurality of vehicle control actuating devices, and means actuated by successive energization of said tuned circuit to operate said vehicle control devices in predetermined sequential relation.

17. In a remote control system for moving vehicles, a receiving system including a tuned circuit responsive to radiant energy signals of predetermined frequency, a plurality of vehicle control actuating devices, means for energizing said actuating devices in response to a predetermined number of energizations of said tuned circuit different for each of said actuating devices.

18. In a remote control system for moving vehicles, a receiving system including a tuned circuit responsive to radiant energy of predetermined frequency, a plurality of vehicle control actuating devices, and electric circuit elements connecting said tuned circuit and said devices including energy-controlling devices actuated by de-energization of said tuned circuit to operate each of said vehicle control devices in predetermined sequential relation.

19. In a remote control system for moving vehicles, a receiving system including a tuned circuit responsive to radiant energy of predetermined frequency, a plurality of vehicle control actuating devices, and electric circuit elements connecting said tuned circuit and said devices including energy-controlling devices actuated by de-energization of said tuned circuit to operate each of said vehicle control devices in predetermined sequential relation, said electric circuit elements including time-delay devices to provide a predetermined interval between the operation of each successive vehicle control device.

20. In a remote control system for moving vehicles, a receiving system including a tuned circuit responsive to radiant energy of predetermined frequency, a plurality of vehicle control actuating devices, and electric circuit elements connecting said tuned circuit and said devices including energy-controlling devices actuated by de-energization of said tuned circuit to operate each of said vehicle control devices in predetermined sequential relation and actuated by de-energization of said tuned circuit to interrupt said sequence of operations.

21. In a remote control system for moving vehicles, selective control actuating means comprising a manually movable member, a driven member, power means in driving connection with said driven member, signal transmitting means including signal modulating means, and means selectively actuated by movement of the manually movable member to energize said power means and to energize said signal transmitting means to transmit a signal modulated in accordance with the direction of motion of the manually movable member and actuated by movement of the driven member to deenergize said power means and said signal transmitting means.

22. In a remote control system for moving vehicles, selective control actuating means comprising a manually movable member, a driven member, power means in driving connection with said driven member, signal transmitting means, and means actuated by movement of the manually movable member to energize said power means and said signal transmitting means and actuated by movement of the driven member to de-energize said power means and said signal transmitting means.

CARL DE GANAHL.

---

Certificate of Correction

Patent No. 2,393,892. January 29, 1946.

CARL DE GANAHL

It is hereby certified that error appears in the printed specification of the above numbered patent requiring correction as follows: Page 8, second column, lines 8–9, claim 20, for "de-energization" read *re-energization*; and that the said Letters Patent should be read with this correction therein that the same may conform to the record of the case in the Patent Office.

Signed and sealed this 30th day of April, A. D. 1946.

[SEAL]

LESLIE FRAZER,
*First Assistant Commissioner of Patents.*